C. M. CLAY.
HOSE COUPLING.
APPLICATION FILED JULY 12, 1916.
1,252,660.
Patented Jan. 8, 1918.
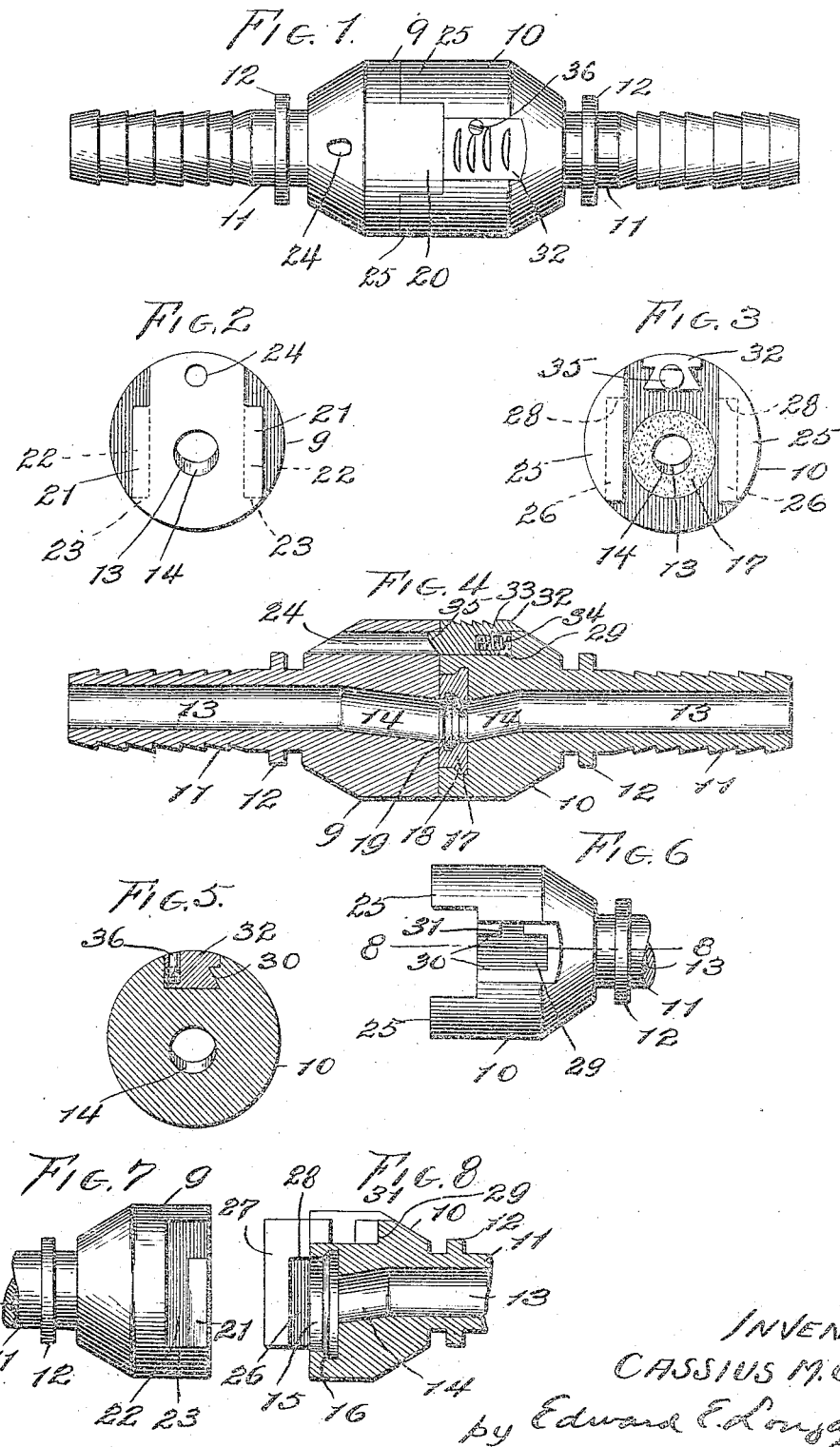
INVENTOR
CASSIUS M. CLAY
by Edward E. Longan
ATTY.

UNITED STATES PATENT OFFICE.

CASSIUS M. CLAY, OF MEXICO, MISSOURI.

HOSE-COUPLING.

1,252,660.

Specification of Letters Patent.

Patented Jan. 8, 1918.

Application filed July 12, 1916. Serial No. 108,949.

*To all whom it may concern:*

Be it known that I, CASSIUS M. CLAY, a citizen of the United States, and resident of Mexico, Missouri, have invented certain new and useful Improvements in Hose-Couplings, of which the following is a specification containing a full, clear, and exact description, reference being had to the accompanying drawings, forming a part hereof.

My invention relates to improvements in hose couplings and the object of my improvements is to construct a coupling comprising members which inter-hook and which is provided with a locking means against uncoupling, a portion of the locking means conforming with the external surface of the body of the coupler in order to prevent its being caught and released by engagement with other objects and the inter-hooking portions of the members arranged to be inter-engaged from one end only to assure the proper working of the locking means.

With the above and other objects in view which will be hereinafter made clear my invention consists in certain novel details of the construction and arrangements of parts which will be hereinafter fully, clearly and concisely set forth in my specification, pointed out in my claims and illustrated by the accompanying drawings, in which—

Figure 1 is a plan of the complete coupling;

Fig. 2 is an end view showing the meeting face of one of the coupling members;

Fig. 3 is a view similar to Fig. 2 of the other coupling member;

Fig. 4 is a longitudinal sectional elevation of the two members coupled;

Fig. 5 is a transverse sectional elevation of the coupling member shown in Fig. 3 taken through its locking element;

Fig. 6 is a plan of one of the coupling members with a portion of the hose stem broken away and the locking element removed.

Fig. 7 is an elevation of the members shown in Fig. 2 with a portion of the hose stem broken away, and Fig. 8 is a longitudinal sectional elevation taken on the line 8—8 of Fig. 6, the locking device and the expansible gasket being removed.

Referring by numerals to the accompanying drawings, 9 and 10 designate the body portions of the two coupling members, the portions of which next their meeting faces are cylindrical, the remaining portions that is the portions next the hose stems are chamfered or frusto-conical. Formed integral with each members 9 and 10 and extending outwardly from the frusto-conical portions are the hose stems 11 each of which bears adjacent the frusto-conical portion an annular flange 12 whereby to facilitate the securing of a section of hose to the stem. The body portions of the stems beyond said flanges are serrated as is common. Formed through each stem and concentric therewith is a bore 13 and formed through the bodies of the members 9 and 10 are the bores 14.

The reference numeral 15 designates a cavity formed in the meeting face of the member 10, concentric with the bore 14 but eccentric to the body of the member, the inner end of said depression having greater diametrical dimensions than the outer end forming an inclined shoulder 16.

The reference numeral 17 designates an expansible gasket the outer surface of which is shaped to conform with the depression 15 in the member 10, the gasket having at its innermost end a peripheral flange 18, engageable to the rear of the shoulder 16 of the member to prevent unseating of the gasket when pressure is applied to the fluids when passing therethrough. This gasket 17 is of ring-like formation, its inner surface having therein a depression which forms a lip 19 arranged to be acted upon by fluid under pressure to be forced outwardly beyond the face of the coupling member 10, to engage with and form a leak-tight joint with the meeting face of the companion member 9. By this arrangement of gasket the gasket will normally lie wholly within the depression formed in the coupling member but be expanded, that is the lip 19 beyond normal dimensions when a fluid pressure is acting upon the lip.

As shown in Fig. 1 the body portion 9 has projecting inwardly therefrom a head 20 extending in one direction the full diameter of the member and in the opposite direction less than the diameter of the member. Along each side of the projecting head and next the meeting face of the member is a flange 21 forming next the body of the member a channel 22, these channels being open at their tops but closed by the shoulders 23 at their bottoms.

Formed through the body of the member 9 is a bore 24 paralleling the axis of the member and open at both ends. Extending outwardly from the body portion of the member 10 are the spaced heads 25—25, the space intervening between the said heads being of the same dimension as the head 20 of the member 9 the heads 25 and head 20 forming integral continuities of the bodies of the members 9 and 10. As clearly shown in Fig. 3 the heads 25 have in their inner faces the channels 26 forming flanges 27 extending only a portion of the lengths of the heads so that when the two coupling members are to be coupled the inter-engaging flanges 21 and 27 are only inter-engageable in one direction, the stops or shoulders 23 together with the stops or shoulders 28 limiting the sliding movements of the two members in coupling in order to bring the members in perfect relative registration.

In the top of the member 10 there is formed a cavity 29 paralleling the axis of the member and having its side walls 30 under-cut as clearly shown in Fig. 5, the one said wall having a notch 31 therein.

The reference numeral 32 designates a sliding block arranged for movement in the depression 29 and between the walls 30 thereof, this block having its side shaped to conform with the depression and having dove-tail connection with the member the block is prevented from moving radially relative to the member 10 but is capable of axial movements relative to the member, the outer or upper surface of the block being shaped to conform with the cylindrical body of the member 10.

As clearly shown in Fig. 4 the block has formed therein a bore 33 arranged to receive an extensile coil spring 34 the one end of which impinges the block to normally hold it with its one end in registration with the meeting face of the member 10 its other end impinging the rear wall of the cavity 29. At the forward end of the block there is a latch 35 the outer face of which is beveled to facilitate its seating into the end of the bore 24 which bore forms with said latch the lock for securing the coupling members against uncoupling the inclined face of the latch making the locking of the coupling members automatic.

By reason of the bore 24 being open at both ends the likelihood of its being filled with foreign matter is reduced to a minimum.

Carried by the block 32 is a pin 36 which is seated in the block through the notch 31 in the depression 29 of the member 10 the function of the pin 36 being to limit the motion of the block and prevent its being wholly disengaged from the member 10.

It will be apparent from the construction illustrated and as just described that the cylindrical formation of the coupling members together with the locking elements therefor reduce to a minimum the likelihood of the united coupling members from being uncoupled by engagement with other objects. It will be apparent further that the coupling members are so arranged as to be coupled in one direction only in order to properly relate the members to the locking mechanism so that the locking device will automatically operate.

I have shown the bores 14 through the bodies of the coupling members to be non-alined with the bores 13 of the stems of the coupling members, which expedient permits the placement of the gasket 17 and the sliding block 32 carrying the latch 35 in a coupling member of minimum diametrical dimensions.

Having thus described my invention what I claim as new therein and desire to secure by Letters-Patent of the United States, therefor is—

1. A cylindrical hose coupling member having a bore therethrough eccentric to the body of the member and a cavity in its end concentric with the bore, a gasket arranged in said cavity and a latch comprising an element arranged for movement lengthwise of the member within the peripheral, uninterrupted cylindrical surface of the member.

2. A hose coupling comprising a pair of members having end portions of substantially cylindrical formation and of smooth uninterrupted exterior, and having at their meeting ends interengaging devices, and a lock for holding said devices in engagement comprising a seat in the meeting face of one member, an element arranged for movement lengthwise of the other member, having its outermost face exposed throughout its length and shaped to conform with the periphery of the coupling member, a spring for holding the element to its one limit of movement and a latch carried thereby for insertion in said seat, substantially as shown and for the purposes stated.

In testimony whereof, I have signed my name to this specification, in presence of two subscribing witnesses.

CASSIUS M. CLAY.

Witnesses:
 JOHN T. RICKETTS,
 F. P. VAN NESS.

Copies of this patent may be obtained for five cents each, by addressing the "Commissioner of Patents, Washington, D. C."